Figure 1:
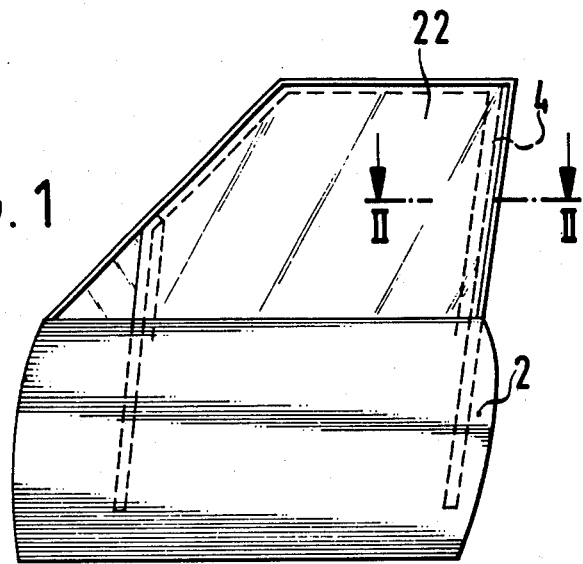

United States Patent [19]

Warner

[11] Patent Number: 4,611,435

[45] Date of Patent: Sep. 16, 1986

[54] WINDOW PANE ADJUSTABLE IN HEIGHT, PARTICULARLY FOR MOTOR VEHICLES

[75] Inventor: Hermann Warner, Trebur, Fed. Rep. of Germany

[73] Assignee: General Motors Corporation, Detroit, Mich.

[21] Appl. No.: 593,899

[22] Filed: Mar. 27, 1984

[30] Foreign Application Priority Data

Apr. 7, 1983 [DE] Fed. Rep. of Germany ....... 3312470

[51] Int. Cl.$^4$ ............................................. E05F 11/38
[52] U.S. Cl. ......................................... 49/374; 49/440
[58] Field of Search ................ 49/227, 374, 485, 490, 49/502, 375, 440, 441

[56] References Cited

U.S. PATENT DOCUMENTS

| | | | |
|---|---|---|---|
| 2,024,773 | 12/1935 | Lohrman | 49/374 |
| 3,162,281 | 12/1964 | Kraska et al. | 49/374 |
| 3,745,709 | 7/1973 | Penna | 49/465 |
| 4,240,227 | 12/1980 | Hasler et al. | |
| 4,417,419 | 11/1983 | Rossie et al. | 49/374 X |
| 4,418,498 | 12/1983 | Wanlass et al. | 49/375 X |
| 4,454,688 | 6/1984 | Rest et al. | 49/374 X |
| 4,483,100 | 11/1984 | Blankenburg et al. | 49/374 X |
| 4,490,942 | 1/1985 | Arnheim et al. | 49/374 |

Primary Examiner—William E. Lyddane
Assistant Examiner—James R. Brittan, Jr.
Attorney, Agent, or Firm—William A. Schuetz

[57] ABSTRACT

In a vertically adjustable window pane which is to be guided on only one side of the window, a stationary resilient guide member provided with an undercut facing in a direction away from the window and a guide rail secured to a side edge of the window which cooperably received within the guide member to guide the window pane when it is vertically adjusted.

3 Claims, 2 Drawing Figures

WINDOW PANE ADJUSTABLE IN HEIGHT, PARTICULARLY FOR MOTOR VEHICLES

The invention relates to a vertically adjustable window pane, especially adapted for use in motor vehicles, which is positioned so as to be flush with the adjacent body panels, and including window guide means and sealing means which are disposed on the inboard side of the vehicle, with the window guide means extending along the window frame and an elastic profiled guide member being interposed therebetween.

In one prior art arrangement of this type disclosed in DE-OS No. 31 10 669, the window pane itself or its guide means, in this particular instance a guide rail, is guided for vertical movement by the window sealing strip itself or by the profiled guide member provided for the guide rail. However, this arrangement of guiding the window pane in both directions is satisfactory only if there is provided on the opposite edge of the window pane the same type of sealing strip or profiled guide member. Unfortunately, in most instances conditions do not permit the employment of identical guide means at the forward and rearward edge of the window pane so as to achieve proper longitudinal guiding of the window pane.

It is the object of the present invention to provide a vertically adjustable window pane in which, in a relatively simple manner, guiding in the longitudinal direction is effected only along one lateral edge of the window pane, i.e., in which only one guide means is being employed. While the other edge of the window pane may also be guided, it is not necessary to do so. This arrangement will provide that insertion of the window pane into the guide means may be initiated in a simple manner from any place, rather than just from the top or bottom, an arrangement that offers the advantage of simplified assembly.

This objective is being accomplished in accordance with the invention in that the profiled guide member is provided with an undercut facing away from the window edge, which cooperates with an undercut provided on the guide means (guide rail). This will cause the guide rail to be retained in the profiled guide member, and the arrangement permits only very little displacement in longitudinal direction. During assembly, the profiled guide rail will readily snap into the profiled guide member.

In accordance with another feature of the invention, the undercut of the guide rail is formed by a bead provided on the free edge of the rail and is provided with tapered surfaces so that the rail can be snapped into and retained within the profiled guide member. These tapered surfaces provide that the rail can easily be snapped into the profiled guide member from the side. The flocked profiled guide member is such that the place at or adjacent the undercut will flex when the guide rail is being inserted into the profiled guide member, so that the rail with the required tolerances is then permitted to slide within an area adjacent to the undercut and a limiting wall which is formed by the guide rail. The sliding surfaces may be in the form of surfaces that are outwardly contiguous to the undercut and which are extending at an angle to one another. By providing that the window pane is guided longitudinally, there is no need for a fixed point in the window lift mechanism.

Preferably, the guide rail, when viewed in cross section, is comprised, in a manner known in the art, of a pair of legs extending parallel to the window frame, one of which being in the form of a double leg which embraces the edge of the window pane from both sides, and the other leg being adapted to cooperate with the profiled guide member. The two legs are joined on the same side by a web which extends essentially in the direction of the line of pivoting of the door. This design is very compact. The web closes the gap between the window pane and window frame, which already provides a certain degree of sealing.

Preferably, the guide rail is in the form of a doubled sheet metal strip whose free ends are spaced apart from one another so as to form the double leg, and wherein the other folded end is forming the other leg with the undercut.

Figure 2:
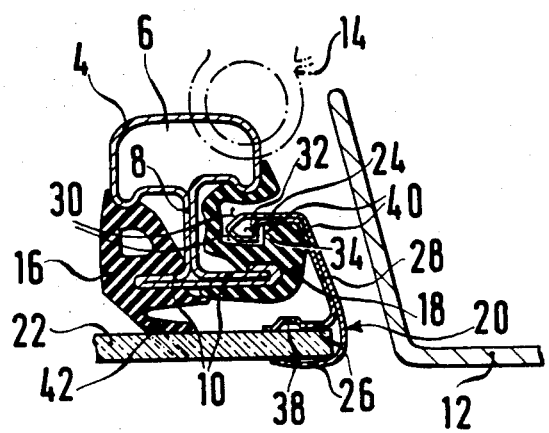

One exemplary embodiment is illustrated in the drawing, wherein:

FIG. 1 is a side view of a vehicle door, and
FIG. 2 is a cross section according to line II—II of FIG. 1.

The vehicle door 2 illustrated in FIG. 1 is provided with a window frame or frame means 4 disposed towards the inside of the vehicle. The lateral portions of said window frame are extending downwardly between the outer and inner door panel. The window pane 22 is guided along the window frame 4 so as to be substantially flush with adjacent body door panels or door pillar 12. The window frame 4 may be of the rolled steel section type. Its cross section, which is illustrated in FIG. 2, is comprised of a tubular body portion 6, an adjoining web or web portion 8 extending transversely of the body portion 6 and a pair of flanges or flange portions 10 extending at right angles with respect to said web 8. The body, web and flange portions 6, 8 and 10, respectively, define a pair of oppositely facing channels for receiving an extruded sealing strip 16 and an extruded stationary guide member or means 18. Numeral 12 denotes a portion of the door pillar, and numeral 14 the door sealing strip.

The extruded window sealing strip 16 and the extruded stationary guide member or guide means 18 are attached to the window frame 4. The guide rail or movable guide member 20 is secured to the window pane 22. As is apparent from FIG. 2, the rail 20 consists of a doubled or folded over itself sheet metal strip. The rail 20 is formed or bent to provide a leg 24 along one side which extends generally parallel of the window pane 22 at a location interiorly of and spaced inwardly from the side edge of the window pane 22, and a double leg 26 along its other double leg 26 is bifurcated to provide two leg portions which are adapted to embrace the side edge of the window pane 22. Interconnecting the legs 24 and 26 is a flexible web or web portion 28 which extends in the door pivoting line. The leg 24 at its free end is formed in the shape of a bead or head to provide two converging tapered surfaces 30. The bead or head of the leg 24 defines with the web 28 a recess or undercut 32.

The stationary guide member 18 is provided with an undercut or recess 34 facing away from the window pane 22 so as to define a bead or protrusion which is adapted to be received within the recess 24 of the guide rail 20. The undercuts or recesses 32 and 34 accomplish that the window pane is guided in the longitudinal direction of the vehicle. The tapered surfaces 30 at the leg 24 serve as a means to facilitate assembly of the guide rail 20 to the guide member 18 in that the web 28 of the rail 20 can be deflected to enable the bead of the leg 24 to ride over the bead on the guide member 18 and be snap fittingly received within the recess or undercut 34 of the guide member 18.

The leg ends 26 are secured to the edge of the window pane 22 by bonding. The hollow spaces 38 in the legs 26 serve to accommodate any excess adhesive material. The guide member has two surfaces 40 which are disposed at an angle to one another and which are adjacent or contiguous to the undercut 34. The surfaces 40 are shaped complementary with the leg 24 and web 28 of the guide rail 20 and serve as sliding surfaces for the rail 20. The lip 42 of the window sealing strip 16 causes the track 20 to be biased against the surface or surfaces 40.

The embodiments of the invention in which an exclusive property or privilege is claimed are defined as follows:

1. In a door for an automotive vehicle having a window frame means for supporting a vertically adjustable window pane which is substantially flush with an adjacent door pillar of the vehicle, said window frame means being located wholly inwardly of the window pane and comprising a body portion, a bridge portion extending transversely of the body portion and a pair of oppositely facing flange portions extending transversely of the bridge portion at its end remote from the body portion, said body portion, bridge portion and flange portions defining a pair of oppositely facing channels, an elongated flexible stationary guide member disposed within and connected to one of said channels, a guide rail secured to a side edge portion of said window pane and which is slidably received within said one channel, and an elongated elastomeric sealing means carried by said other of said channels of said window frame means and being spaced inwardly of said side edge of said window pane, said sealing means including a sealing lip for engaging said window pane on its interior side to provide a seal between said window pane and said window frame means, the improvement being that said stationary guide member has an undercut facing interiorly and away from the window pane and which defines with other adjacent portions of said guide member a bead extending away from the window pane, and wherein said guide rail is a sheet metal strip folded back onto itself to provide first leg means which are secured to the window pane along its side edge, a web portion extending interiorly of said window pane and second leg means remote from said first leg means and extending inwardly from the side edge of the window pane and generally parallel with the window pane, said second leg means having a bead at its free end which defines an undercut facing toward the window pane and with the bead of said second leg means having a pair of converging tapered surfaces to enable said second leg means of said guide rail to be snapped into said flexible guide member and with said bead of said second leg means being received within said undercut of said stationary guide member to retain said window pane in place on said window frame means when said second leg means is assembled into said flexible stationary guide member, said bead of said stationary guide member having surfaces shaped complementary with adjacent surfaces of said second leg means and web portion of said guide rail to guide the movement of said window pane when its height is adjusted.

2. In a vehicle door, as defined in claim 1, and wherein said legs of said first leg means have hollow spaces to accommodate any excess adhesive material when the legs thereof are attached to the window pane.

3. In a vehicle door, as defined in claim 1 and wherein said sealing means includes a sealing lip for engaging the window pane at its interior side and for biasing the guide rail into engagement with the guide member portion and guide the window pane for movement relative to the stationary guide member.

* * * * *